G. ROYLE.
Door-Check.
No. 160,285. Patented March 2, 1875.
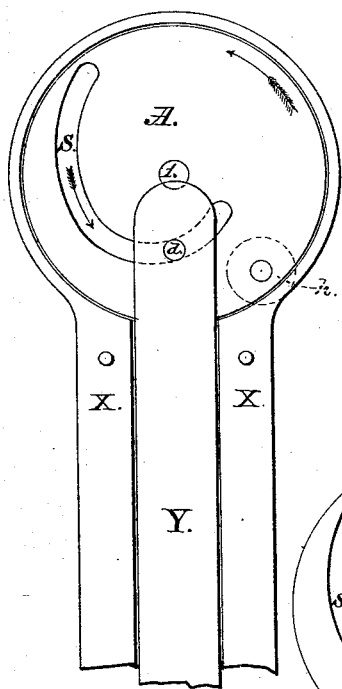
Fig. 1.
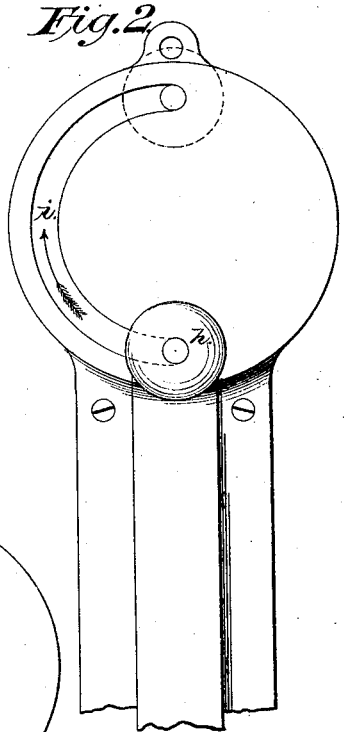
Fig. 2.
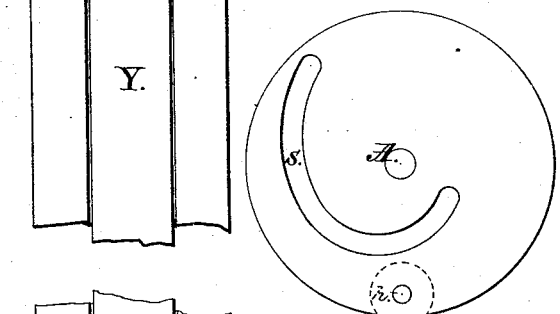
Fig. 3.
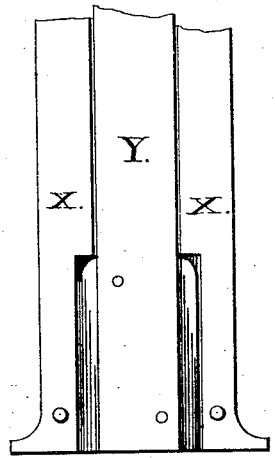
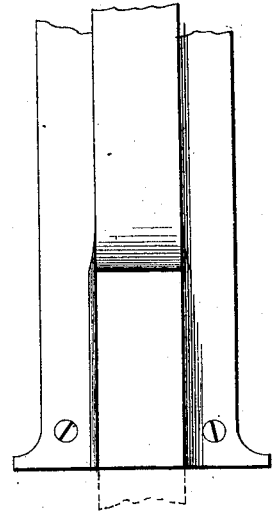
Attest:
Geo. Rusbridge
David Reid
Inventor:
Geo. Royle
THE GRAPHIC CO. PHOTO-LITH. 39 & 41 PARK PLACE, N.Y.

UNITED STATES PATENT OFFICE.

GEORGE ROYLE, OF BUFFALO, NEW YORK.

IMPROVEMENT IN DOOR-CHECKS.

Specification forming part of Letters Patent No. 160,285, date March 2, 1875; application filed June 19, 1874.

*To all whom it may concern:*

Be it known that I, GEORGE ROYLE, of Buffalo, in the county of Erie and State of New York, have invented a Door-Check, of which the following is a specification:

The object of my invention is the production of a door-check that may be conveniently placed upon a door, and by a simple and easy operation hold the same in any desired position, in such a manner that it cannot easily be moved or opened from without when the door is closed by my device; and the invention consists in the arrangement, with a suitable casing and a corresponding bolt, of a revolving disk provided with an involute slot running from near the center of the disk to within a short distance from the periphery of the same, and placed within a circular recess of the casing, the bolt being connected with the involute slot of the disk by means of a stud or pin, in such a manner that the revolution of the disk in one direction will push the bolt out of the casing, while an opposite movement of the same will draw the bolt into the casing.

In order to enable any one skilled in the art to which my invention pertains to make and use the same, I shall proceed to describe its construction and operation, having reference to the accompanying drawing, which makes part of this specification, and illustrates my invention more fully.

In the drawings, Figure 1 is a rear elevation, Fig. 2 a front elevation, and Fig. 3 a front view, of disk A.

Like letters of reference indicate like parts in the several figures.

X is a casing for my improved door-check. It is made of any suitable material, and may be ornamented according to taste. It is provided on its upper extremity with a circular recess having within its center the pivot 1, and being of such a depth as to inclose the revolving disk A ,which is turning upon the said stud 1. The circular recess of the casing X is provided near its outer edge with a circular slot-hole, *i*, arranged concentric with pin 1, for the passage of a handle or knob, by means of which the disk A is revolved. The circular recess for the reception of disk A is situated on the end of the casing X; but it may also be placed anywhere in the casing X. The casing X is closed by means of a cover, (not shown in the drawing,) which cover, however, is not an essential part of my device, as the casing X may be attached directly to the door without the cover, the door in that case serving as such. A is a disk fitting the circular recess of casing X. It is provided within its face with a slot, S, describing an involute curve running from near the center to within a short distance from the periphery of the said disk A. It is furthermore provided with a knob or handle, *h*, passing through the concentric slot *i* of casing X, and serving as means for turning the disk A. Y is the bolt operating within a groove of the casing X. It is provided near its upper extremity with a stud, *d*, engaging with the involute slot S, so that when the disk is rotated it will push the bolt out of the casing X, while a reverse motion operates the bolt in the opposite direction.

It will be observed that the disk A revolves upon the stud 1 of the casing X. This I thought most convenient, although the disk may revolve within the circular casing without the aid of the center stud 1.

To operate my door bolt or check, hold is taken of the knob *h*, and the same turned in the direction of the arrow in Fig. 2. This will push the bolt Y out of the casing X against the floor, thus holding the same in any desired position. The revolution of the knob *h* in the opposite direction will relieve the bolt.

The invention, as described as a door-check, is also applicable as a common door-bolt when attached to a door in the usual manner.

Having thus fully described my invention, I desire to secure by Letters Patent—

The combination, with the case X, having a circular recess, of the revolving disk A, involute slot S, pin 1, concentric slot *i*, handle *h*, bolt Y, and stud *d*, all when arranged to operate substantially as described.

GEORGE ROYLE.

Witnesses:
GEO. RUSBRIDGE,
DAVID REID.